US008903922B2

(12) United States Patent  
Wyatt (10) Patent No.: US 8,903,922 B2  
(45) Date of Patent: Dec. 2, 2014

(54) EXPORTING AN EMAIL THREAD TO A PERSISTENT CHAT ROOM

(75) Inventor: Denise Wyatt, Galway (IE)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 13/192,008

(22) Filed: Jul. 27, 2011

(65) Prior Publication Data

US 2013/0031185 A1     Jan. 31, 2013

(51) Int. Cl.
*G06F 15/16* (2006.01)
*H04L 12/58* (2006.01)
*G06Q 10/10* (2012.01)

(52) U.S. Cl.
CPC .............. *H04L 51/04* (2013.01); *H04L 51/16* (2013.01); *G06Q 10/107* (2013.01)
USPC ........... 709/206; 709/203; 709/204; 709/205; 709/207; 709/217; 709/219; 709/227; 715/751; 715/752; 715/753; 370/352; 370/353

(58) Field of Classification Search
CPC .............................. H04L 12/589; H04L 51/36
USPC ......... 709/203, 204, 205, 206, 207, 217, 219, 709/227; 715/751, 752, 753; 370/352, 353
See application file for complete search history.

(56) References Cited

U.S. PATENT DOCUMENTS

| 7,721,303 | B2 | 5/2010 | Alves de Moura et al. | |
|---|---|---|---|---|
| 8,020,105 | B1 * | 9/2011 | Lemay et al. | 715/746 |
| 2002/0099775 | A1 * | 7/2002 | Gupta et al. | 709/205 |
| 2004/0128356 | A1 * | 7/2004 | Bernstein et al. | 709/206 |
| 2005/0030937 | A1 * | 2/2005 | Wick et al. | 370/352 |
| 2006/0031331 | A1 * | 2/2006 | LoBuono et al. | 709/206 |
| 2006/0101119 | A1 * | 5/2006 | Qureshi et al. | 709/206 |
| 2006/0168026 | A1 * | 7/2006 | Keohane et al. | 709/206 |
| 2006/0190546 | A1 * | 8/2006 | Daniell | 709/206 |
| 2008/0208984 | A1 * | 8/2008 | Rosenberg et al. | 709/206 |
| 2009/0187831 | A1 * | 7/2009 | Tiwana et al. | 715/752 |
| 2009/0210496 | A1 | 8/2009 | Shaffer et al. | |
| 2010/0011373 | A1 * | 1/2010 | Youel et al. | 719/313 |
| 2010/0250683 | A1 * | 9/2010 | Hoyne et al. | 709/206 |
| 2012/0110087 | A1 * | 5/2012 | Culver et al. | 709/205 |

\* cited by examiner

*Primary Examiner* — Liangche A Wang
*Assistant Examiner* — Johnny Aguiar
(74) *Attorney, Agent, or Firm* — Edell, Shapiro & Finnan, LLC (57) ABSTRACT

A method, an apparatus and computer readable storage media facilitate establishing an email thread utilizing an email application used by a client device that communicates with other client devices across a network, where the email thread includes at least one email circulated to a group of users over the network relating to a discussion topic. The email application is linked with a synchronous communication application so as to establish a real-time discussion between at least some of the users of the group in relation to the topic utilizing the synchronous communication application and so that each email of the email thread is accessible via a graphical user interface associated with the synchronous communication application.

23 Claims, 8 Drawing Sheets

EXPORTING AN EMAIL THREAD TO A PERSISTENT CHAT ROOM

TECHNICAL FIELD

The present disclosure relates to email and other forms of network communications.

BACKGROUND

Email communications are a common form of communicating between groups of people in social and business environments. In certain environments, it is quite common for an email user to receive numerous emails in a given period of time (e.g., over a 24 hour period). For an email discussion between multiple users, long email threads can develop with different people providing different insights into the discussion. This can lead to a cluttering of email in a user's mailbox both from an information overload perspective and also a storage perspective. In addition, in certain instances, the asynchronous nature of email communications can hinder the progress of a discussion for a particular issue.

DESCRIPTION OF EXAMPLE EMBODIMENTS

Overview

A method, an apparatus and computer readable storage media facilitate establishing an email thread utilizing an email application used by a client device that communicates with other client devices across a network. The email thread comprises at least one email circulated to a group of users over the network relating to a discussion topic. The email application is linked with a synchronous communication application so as to establish a real-time discussion between at least some of the users of the group in relation to the topic utilizing the synchronous communication application and so that each email of the email thread is accessible via a graphical user interface associated with the synchronous communication application.

Example Embodiments

Figure 1:
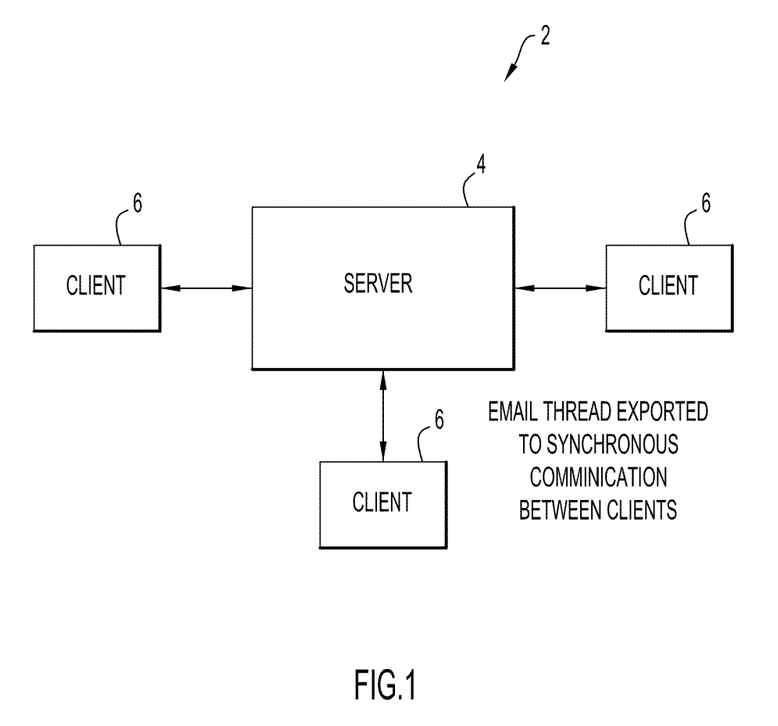
FIG. 1 is a schematic block diagram of an example system in which electronic or computer devices are connected to facilitate communications between the devices.

Referring to FIG. 1, a block diagram is shown for an example system that facilitates transfer of an asynchronous discussion developed by a series or thread of emails relating to a particular topic to a synchronous discussion (e.g., a chat room and/or a video conferencing session) between users/clients associated with the thread of emails. In particular, the system 2 comprises a communication network that facilitates communications between a plurality of users/clients, where the system 2 includes a central server 4 and a plurality of clients 6 that access the server 4. In particular, the server 4 provides a communication link that facilitates transmission of emails as well as other communications between clients 6. While only three clients 6 are shown in the system 2, this is for illustrative purposes only and it is noted that the system 2 can include any number of clients 6 (e.g., hundreds, thousands or even a larger number of clients). Examples of types of networks that can be utilized within system 2 include, without limitation, local or wide area networks, Internet Protocol (IP) networks such as intranet or internet networks, telephone networks (e.g., public switched telephone networks), wireless or mobile phone or cellular networks, and any suitable combinations thereof. The server 4 is a computing device that serves one or more applications, such as an email application used by the clients 6.

Each client 6 connects via any suitable wireless and/or hard wired connection to the server 4 to facilitate communications with other clients over the network. Referring to the block diagram of FIG. 2, each client 6 includes a network interface 8, a processor 10, a memory 12, an input device 14 and an output device 15. The network interface 8 can be, for example, an Ethernet interface card or switch, a modem, a router or any other suitable hardware device that facilitates a wireless and/or hardwire connection over the communication network with the server 4 and other clients 6, where the network interface unit can be integrated within the device or a peripheral that connects with the device. The processor 10 comprises a microprocessor that executes control process logic instructions 16 stored within memory 12, including operational instructions and software applications stored within memory 12 (e.g., email applications and other client communication applications). In particular, the memory 12 includes an email tool 17 (e.g., one or more email software applications), a synchronous communication tool 19 (e.g., one or more software applications that facilitate synchronous communications with other clients, such as instant messaging, video conferencing, etc.), and an email to synchronous communication tool 18 that provides a link between the email tool 17 and the synchronous communication tool 19 so as to facilitate exportation or access of emails from the email tool 17 to the synchronous communication tool 19 during system operation. The processor 10 performs operations in accordance with the steps set forth in the flow chart of FIG. 3 utilizing the email to synchronous communication tool 18, as described further below. The memory 12 may comprise read only memory (ROM), random access memory (RAM), magnetic disk storage media devices, optical storage media devices, flash memory devices, electrical, optical, or other physical/tangible memory storage devices, and any combinations thereof.

Figure 2:
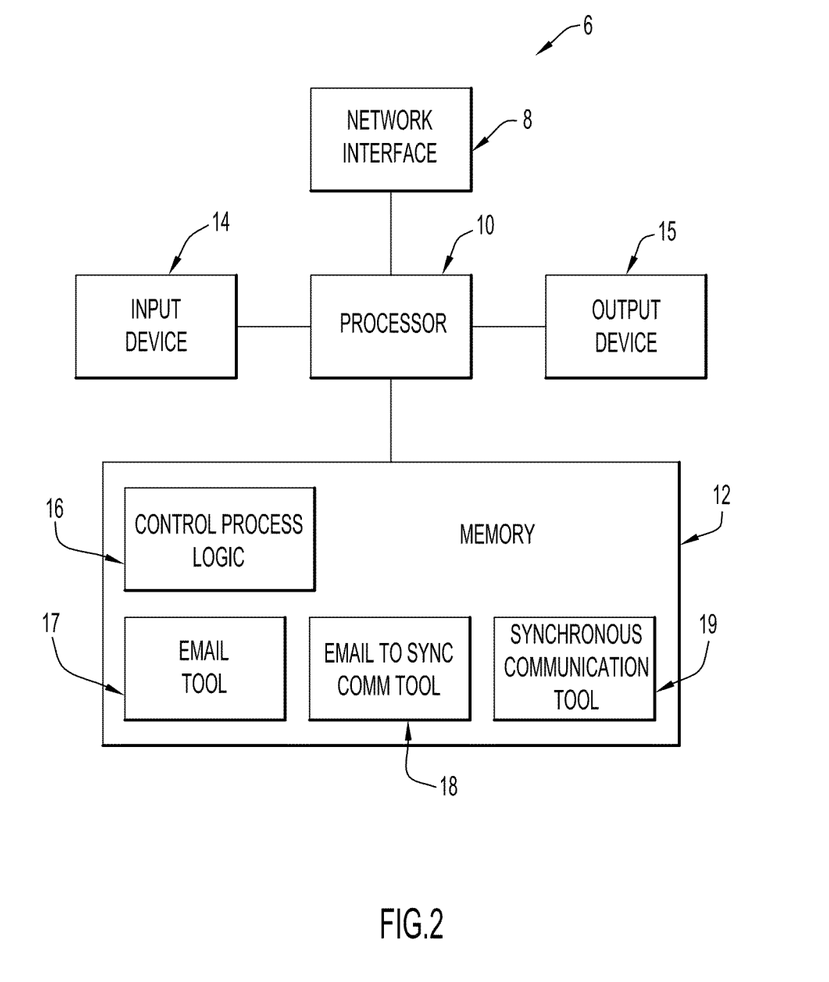
FIG. 2 a schematic block diagram of an example client device configured to engage in email as well as synchronous communications with other client devices utilizing the system of FIG. 1.

The input device 14 includes any one or more suitable components that facilitate input of information as well as audio and/or video content from the user to the client device 6 for use by the processor 10. Examples of suitable input components include, without limitation, a keyboard, a mouse, a microphone (for input of audio content) and a camera (for input of graphical images and/or video content). The output device 15 comprises any suitable one or more components that facilitate display of information including a speaker component (for audio output) and a display monitor (e.g., a liquid crystal display screen and/or a touch display screen) for display of textual and/or graphical content by the processor, including interactive or graphical user interface (GUI) content.

Thus, each client 6 can be any suitable device that is configured to engage in asynchronous communications (e.g., email communications) with other clients as well as synchronous or real-time communications (e.g., instant text messaging communications, A/V conferencing communications, etc.) with other clients over the communication network via the server 4. Some examples of client devices that can be used in system 2 include, without limitation, stationary (e.g., desktop) computers, personal mobile computer devices such as laptops, note pads, tablets, personal data assistant (PDA) devices, and other portable media player devices, and cell phones (e.g., smartphones) including suitable input and output devices as described above. The client devices can utilize any suitable operating systems (e.g., Android, Windows, Mac OS, Symbian OS, RIM Blackberry OS, Linux, etc.) to facilitate operation, use and interaction of the client devices with other client devices via the server 4 over the network.

The server 4 can be a similar device having the same or similar configuration and features as those previously described for the clients 6. The server 4 basically serves the function of handling and transferring communication messages (e.g., email messages, audio and/or video conferencing content, etc.) between two or more clients 6 over the communication network. The server 4 can also have suitable memory capacity to store content associated with client communications for each client 6 (e.g., saved email messages and/or other communications that are accessible by the email software for each client 6). In addition, the server can have suitable software tools that facilitate synchronous communications between the clients 6. For example, in an instant messaging communication or a video conferencing session, the server 4 can host chat rooms or video conferencing rooms that can be attended by clients 6 (where the synchronous communication tool 19 of each client facilitates engaging in such synchronous communication session). The server 4 can also receive and store exported emails from the email thread 302 for access by clients 6 that engage in a synchronous communication associated with the topic of the email thread 302.

Figure 3:
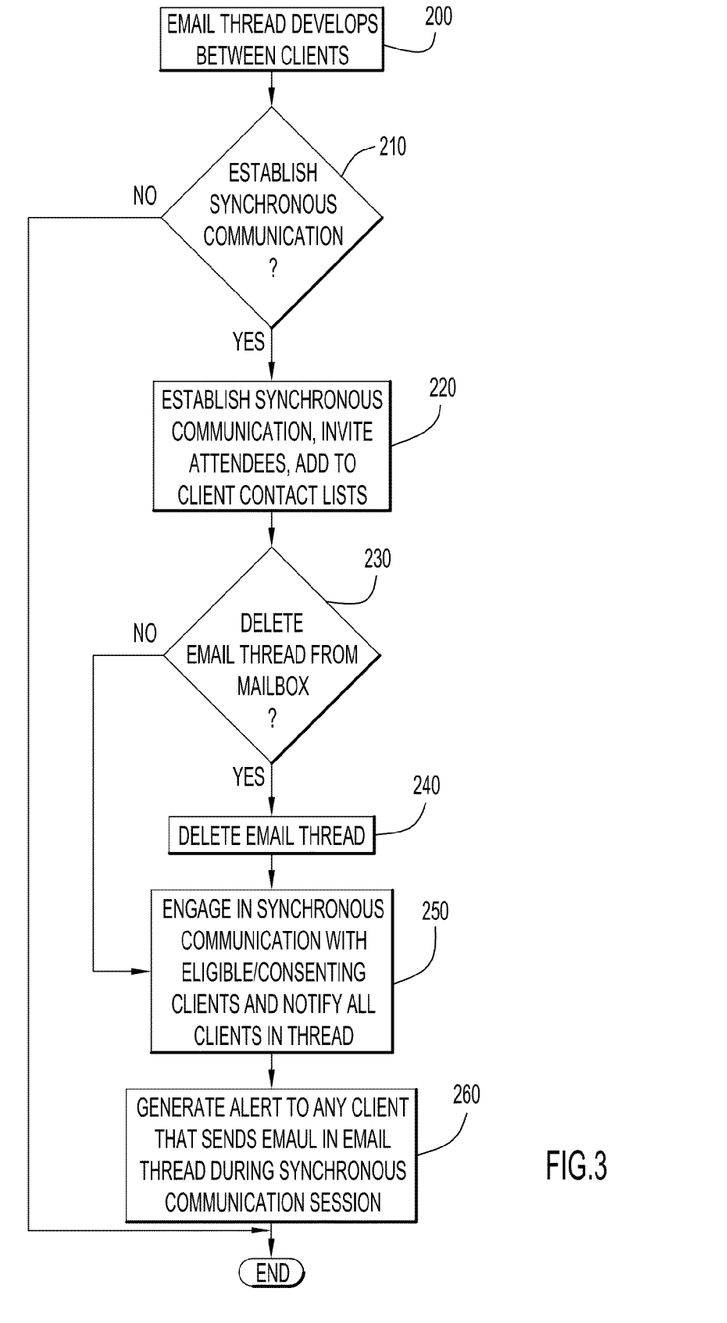
FIG. 3 is a flow chart depicting an example process for exporting an email thread to a real-time, synchronous communication session utilizing the techniques described herein.

Operation of the system 2 is now described with reference to the flowchart of FIG. 3 and also the GUI images set forth in FIGS. 4-8. As noted above, each client 6 includes an email tool 17 comprising one or more software applications that facilitate email communications with other clients 6 over the communication network via the server 4. Examples of email software applications include, without limitation, Microsoft Outlook, Apple Mail, Lotus Notes, etc. The server 4 can be configured to store emails within the mailbox for each client 6, where each client 6 accesses its mailbox via its own email tool 17 and each client 6 is further allotted a predetermined amount of mailbox memory space for storing emails. Each client 6 further includes a suitable synchronous communication tool 19 comprising one or more software applications that facilitate instant messaging or live chats and/or any video or web conferencing with other clients. Examples of such software applications include, without limitation, Skype, WebEx, Voice Over Internet Protocol (VoIP) software applications, and any other suitable form of chat room, instant messaging or live conferencing software. In addition, a client 6 can include unified communications software that integrates as a single or a series of related and interactive software applications the email tool 17 with the synchronous communication tool 19 (e.g., Unified Communications software commercially available from Cisco Systems, Inc.). Further, the email to synchronous communication tool 18 can be integrated with either or both the email tool 17 and synchronous communication tool 19 to form a single or a series of related and interactive software applications. The term "tool" is used herein to refer to an "application" software function or set of functions provided by a software application on a client device or hosted on a server on behalf of a client device.

Figure 4:
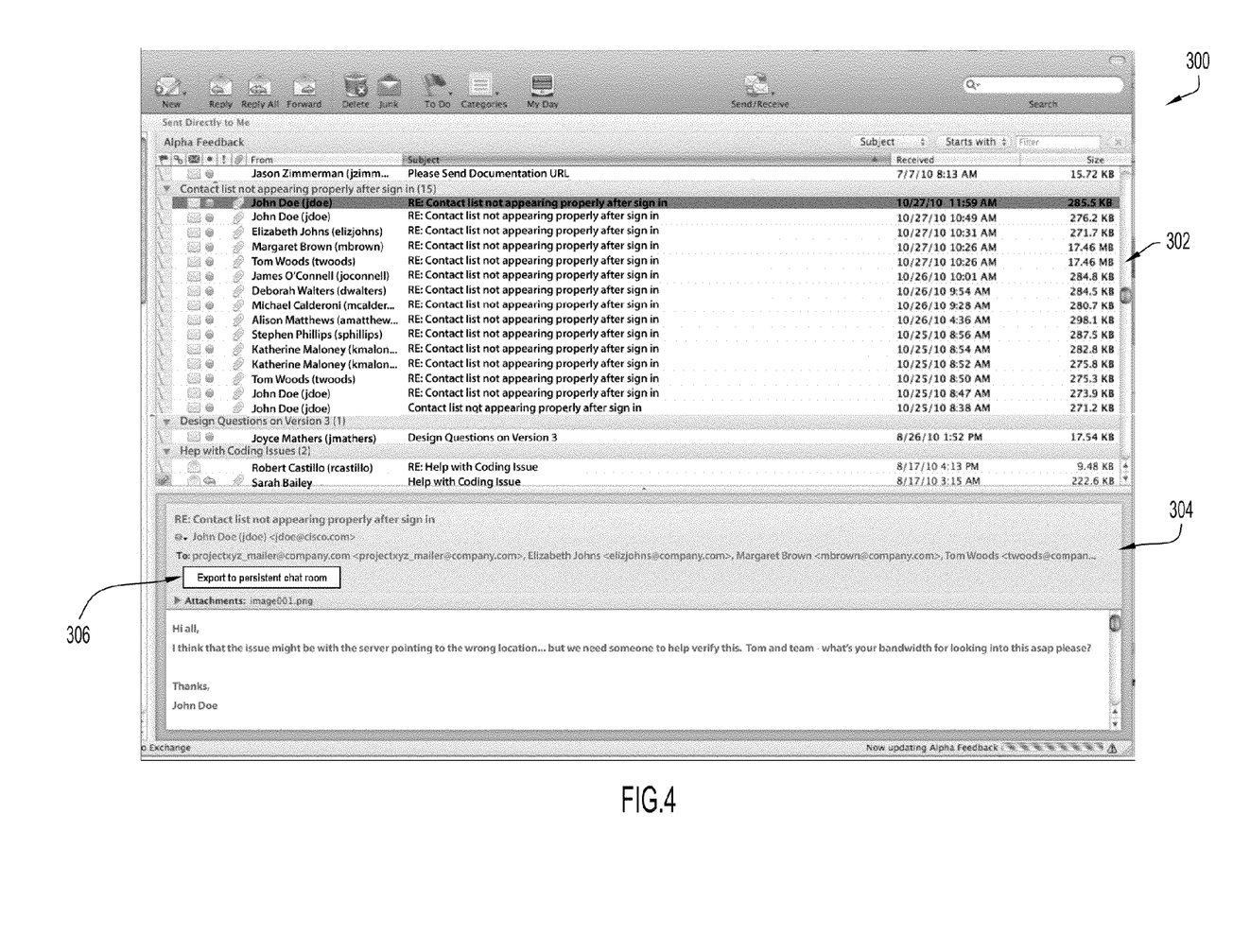
FIGS. 4-8 are examples of graphical user images demonstrating an example of how an email thread between multiple persons is exported to a synchronous communication tool in accordance with the example process depicted in the flow chart of FIG. 2.

Reference is made to FIG. 4 which is a screen shot of a GUI 300. The GUI 300 depicted in FIG. 4 shows a scenario in which the mailbox of an email application is displayed on an output device 15 (e.g., an LCD display monitor) of a client 6. At 200, one or more emails comprising an email thread 302 has developed between multiple clients 6, where the email thread 302 relates to the same topic, which is identified by the subject matter field (also referred to as the subject field or subject line, the RE field, etc.) of each email (e.g., the subject matter referenced as "CONTACT LIST NOT APPEARING PROPERLY AFTER SIGN IN" in the subject lines for the emails of the email thread 302 shown in FIG. 4). In the lower portion of the GUI 300, a window 304 shows an email which is part of the email thread 302. A button 306 is displayed in the window 304 which provides the client 6 with the option of establishing a synchronous communication with other clients associated with the email thread 302. At 210, a decision is made by the client 6 whether to establish a synchronous communication with any of the other clients 6. In this scenario, the synchronous communication comprises a persistent chat room, which can be in the form of an instant messaging format. In particular, button 306 is identified with the text "EXPORT TO PERSISTENT CHAT ROOM". However, as previously noted, the synchronous communication can also be a teleconferencing session between clients engaging in the synchronous communication.

The email to synchronous communication application 18, which includes features associated with the button 306 of the GUI 300, facilitates the mechanism by which one or more clients 6 can establish a synchronous communication by exporting an email thread, which comprises one or more emails, for use by the synchronous communication tool 19. The option to establish a synchronous communication (e.g., a button 306 within the GUI window 304) can be provided by the application 18 automatically. For example, the option to establish a synchronous communication can be provided after a select number of related emails are present within the user mailbox of the client 6, where related emails are identified by having the same information in the subject matter field of an email. Alternatively, the option to establish a synchronous communication can always be present for every email displayed for a client 6 (e.g., button 306 may always be present within window 304). Thus, a client 6 can establish a synchronous communication based upon a single email or a plurality of related emails utilizing the embodiments described below.

Figure 5:
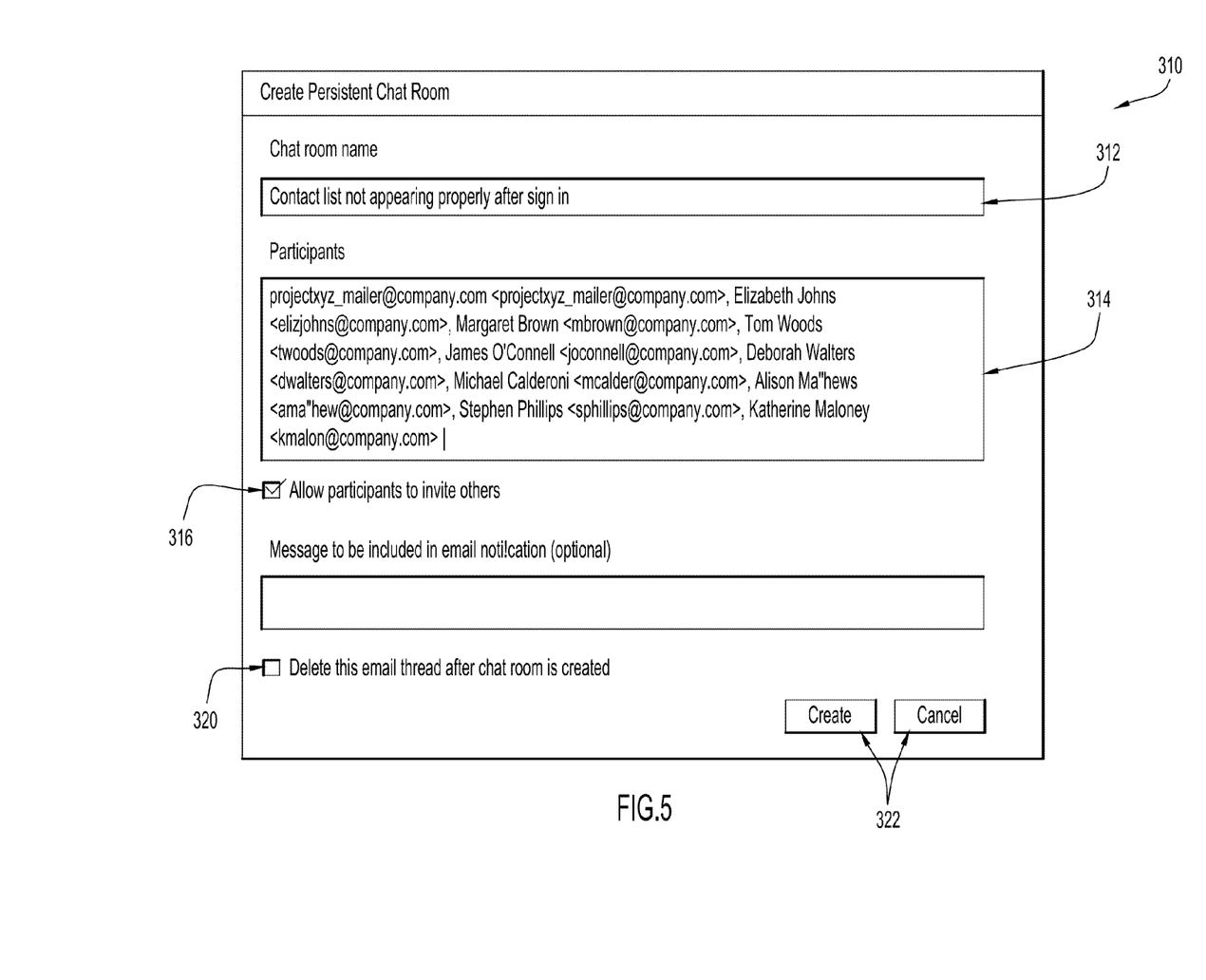

At 220, the client 6 decides to establish a synchronous communication by selecting or clicking on button 306 of the GUI 300. Referring to FIG. 5, a GUI 310 is displayed on the output device 15 of the client 6 after the client 6 selects button 306. The GUI 310 includes a window 312 that provides an identifying name for the synchronous communication, where the email to synchronous communication application 18 can provide a default name which is the same as the information in the subject matter field for the emails of the email thread ("CONTACT LIST NOT APPEARING PROPERLY AFTER SIGN IN", as shown for the emails of email thread 302 in FIG. 4). This window 312 can be modified by the client 6 (using a client input device 14 such as a keyboard to revise the information in window 312).

The GUI 310 provides the client 6 with the option of selecting which potential clients will be sent an invitation to participate in the synchronous communication within window. The email to synchronous communication application 18 can pre-populate window 314 with some or all of the email addresses of clients 6 that are associated with the email thread. For example, the application 18 can automatically list within window 314 the email address for each client 6 that is in the TO: field of any one or more of the emails within the email thread 302. The application 18 can further list the email addresses for clients 6 that are in the CC: field and/or BCC: field of any one or more emails within the email thread 302. The client 6 establishing the synchronous communication has the option of revising this invitation list by adding and/or removing email addresses of clients 6 to the window 314. For example, the client 6 may choose to limit the invitation to only a select number of other clients associated with the email thread 302, or the client 6 may also choose to extend the invitation to certain clients that may not be associated with the email thread. A check box 316 is also provided within GUI 310 which selectively provides the ability of invitees to extend the invitation to others. In other words, by checking box 316, the client 6 establishing the synchronous communication has allowed for invitees/participants to invite others to participate, while an unchecked box 316 prohibits this feature. In an example embodiment, an invitee can extend the invitation to others to attend the synchronous communication session (when permitted) utilizing the synchronous communication tool 19 of the client device 6 associated with that invitee. Window 318 of GUI 310 allows the client 6 to add an additional message to be included in the invitation to clients to attend the synchronous communication.

At 230, the client 6 is provided with the option (via by checking box 320 within GUI 310) of deleting all the emails within the email thread 302 from the client's mailbox (e.g., from the inbox folder of the mailbox, or from all mailbox folders, including inbox folder, sent folder and deleted folder of the client's mailbox) after a synchronous communication has been established. As described below, generation of the synchronous communication includes the exportation of all emails from the email thread 302 to a suitable memory storage location (at certain clients 6 or at the server 4) that is accessible during the synchronous communication session. Thus, there may be no need for the emails of the email thread 302 to be located in the client's mailbox. Deletion of the emails from the email thread 302, which occurs at step 240, results in increasing the usable or available memory assigned to the client's mailbox.

The CREATE and CANCEL buttons 322 within GUI 310 provide the client 6 with the option of proceeding with establishing the synchronous communication or canceling the process.

Figure 6:
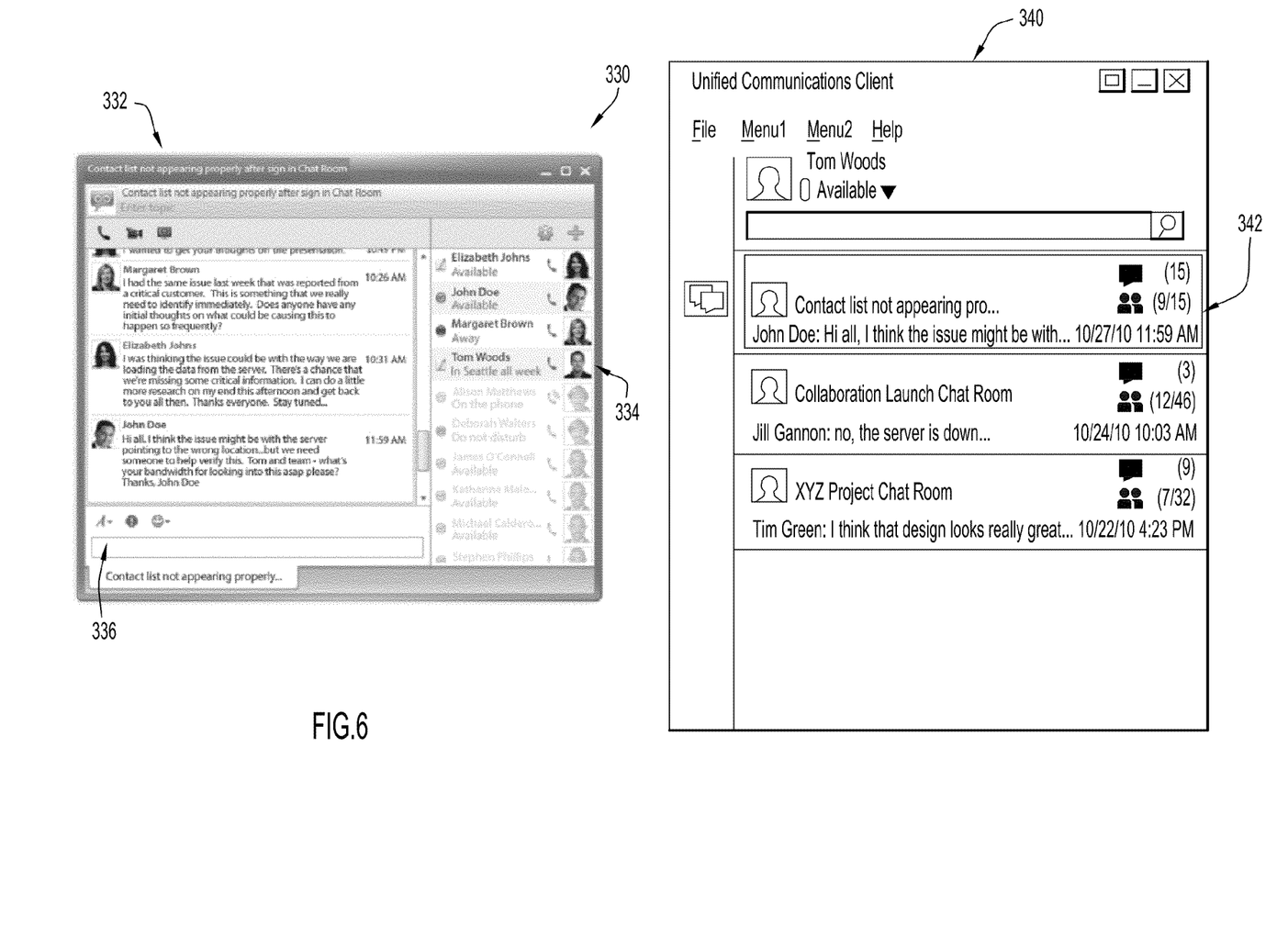

After the client 6 selects the CREATE button 322, an invitation email is automatically generated by the application 18 and sent to each client email address listed in window 314 requesting these clients to engage in the synchronous communication. Reference is made to FIG. 6 which is a screen shot of a GUI 330. As shown in FIG. 6, a new synchronous communication session is then established by the email to synchronous communication tool 18 for each participating client in the form of a chat room GUI 330. The chat room can be hosted and operated by the server 4, while the email to synchronous communication tool 18 and the synchronous communication tool 19 of each client 6 allow the clients to engage in the synchronous communication session. Emails from the email thread 302 are exported (e.g., to a memory location at the server 4), and GUI 330 allows each client 6 participating in the synchronous communication session to view such emails, which are shown within window 332 of the GUI 330. Thus, participating clients are provided with the ability to view emails within the email thread 302 while engaging in the synchronous communication with other participating clients. Viewing of the emails at GUI 330 is associated with the synchronous communication tool 19, which is different from viewing such emails in the mailbox associated with the email tool 17. The window 334 of GUI 330 shows a status list of invited clients who have responded to the invitation and are either available or not available to participate in the synchronous communication. The window 336 provides a field that allows a client 6 to engage in real time communications with other participating clients (e.g., by typing in text messages that are instantly displayed to other attendees of the synchronous communication session).

The GUI 340 shown in FIG. 6 is associated with the synchronous communication tool 19 of each client 6. In this embodiment, the tool 19 comprises unified communications client software that integrates email operations with chat room/instant messaging/video conferencing communications. The email to synchronous communication tool 18 can be integrated with the unified communications client software so as to facilitate the feature of exporting emails in the email thread 302 to the chat room (which are accessible for viewing by each client via GUI 330) as well as the other operations as set forth in the flow chart of FIG. 3. However, in embodiments in which a client email tool is separate from a client synchronous communication tool, the email to synchronous communication tool 18 comprises one or more software applications that provide plug-in features to bridge the two applications so as to link the email thread with the synchronous communication session and perform the other operations as set forth in the flow chart of FIG. 3.

The synchronous communication session is added to the contact list 342 of the GUI 340. This contact list 342 allows a client 6 to move from one chat room to another, with a showing of how many unread messages are in a particular chat room and/or how many attendees are currently in a particular chat room at any given time (e.g., a number of current participants in combination with a number of total invitees, so that one can determine what number of invitees are currently attending a particular chat room). For example, referring to the synchronous communication/chat room session named "CONTACT LIST NOT APPEARING . . . " in FIG. 6, the number (15) in parentheses indicates the number of unread messages from the email thread 302 that was exported to this chat room, while the number (9/15) in parentheses indicates the number of currently participating attendees (9) in the chat room vs. the number of invited participants (15). The email to synchronous communication tool 18 automatically populates the contact list 342 for each invited client with an indication of this synchronous communication session. In addition, the string of text for each listing of the number of unread messages and the number of current participants vs. number of invited participants shown for each chat room session is dynamically updated in the GUI 340 as these values change.

The text that appears below the chat room name for each chat room session in the GUI 340 can be a portion of a message that was imported to that chat room session, such as the last message that was entered in the chat room (e.g., a recent message posted in the actual chat room or the last email message from the email thread that was exported into the chat room.) This text can also be a dynamically updated string of text for the GUI 340 that always pulls in the latest message from the chat room allowing the user to get a quick snapshot of the current conversation, hence assisting the user's decision of whether to enter the chat room or not.

Figure 7:
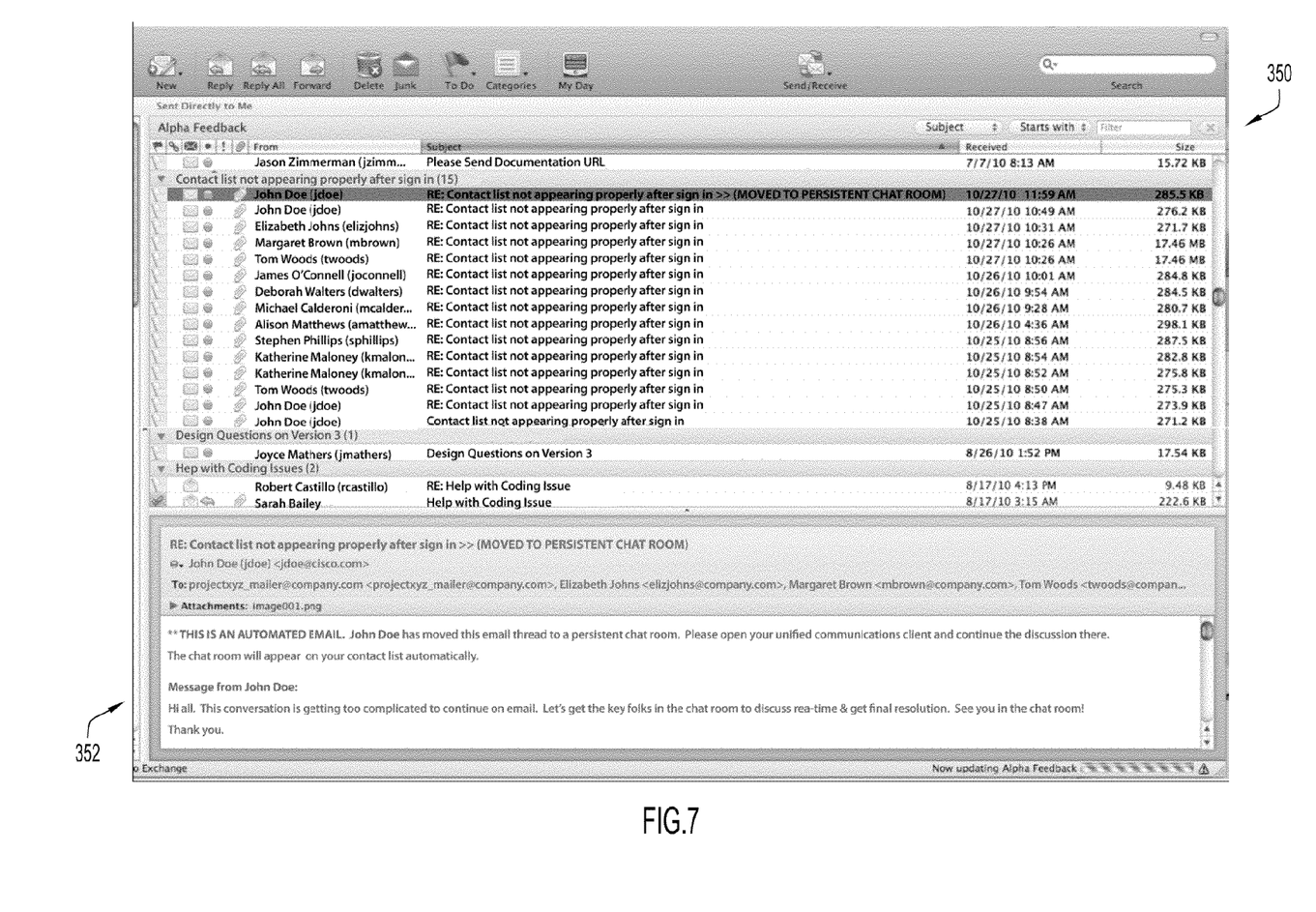
Figure 8:
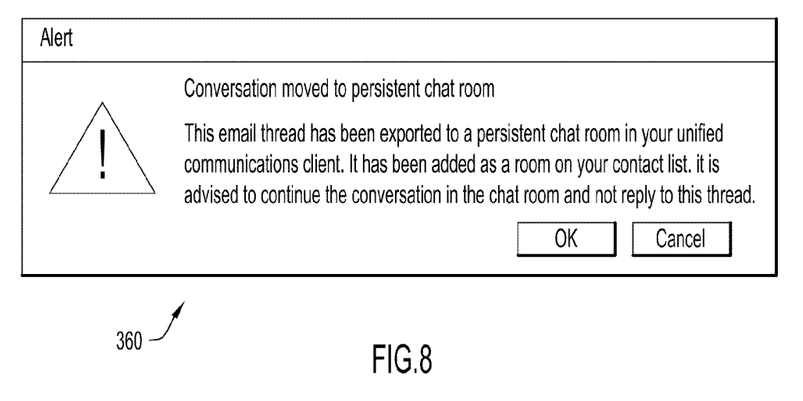

After the chat room and/or other synchronous communication session has been generated, at 250 the attendee clients can engage in real-time communications in relation to the topic of the email thread 302. In addition, as shown in the screen shot of GUI 350 depicted in FIG. 7, an email 352 is automatically sent by the email to synchronous communication tool 18 to each client 6 associated with the email thread 302 (e.g., invited clients and also non-invited clients) providing a notification that the email thread conversation has now been moved to a synchronous communication session. The email 352 can further include the name of the specific user associated with the client 6 making the invitation (e.g., John Doe as shown in FIG. 7) and can also include an additional message from this specific user (e.g., this could be the same message input into window 318 of GUI 310 which is sent with the invitation email to invited clients).

At 260, the email to synchronous communication tool 18 generates an alert to any client that sends an email in relation to the email thread 302 after the synchronous communication session has been generated. Identification of such emails is based upon the content of the subject matter field of the email. For example, if a client responds to one of the emails in the email thread 302 while a synchronous communication session is in progress, this email will be readily identified since it will likely have the same subject matter line as the emails of the email thread 302 ("CONTACT LIST NOT APPEARING PROPERLY AFTER SIGN IN"). An example of an alert message that the application 18 generates for display to the client 6 sending the email message is shown as the GUI 360 of FIG. 8. The alert message can be configured to allow the client 6 to continue by sending the email response and also provides the client with the option of joining the synchronous communication session (provided this particular client has been invited to join the session). In addition, the system 2 can be configured to provide administrator control to selectively prohibit or restrict additional email messages associated with an email thread from being sent once the email thread has been exported to a synchronous communication session, thus limiting excess email chatter about the topic of the email thread that is now being negotiated via the synchronous communication session.

In addition, in the event the subject matter line of a new email associated with an email thread changes (either accidentally or intentionally by a client 6 sending an email message in the thread), the email to synchronous communication tool 18 can be configured to still identify the new email message as being part of the email thread in a number of different ways. Some examples in which the email to synchronous communication tool can be configured to identify such new email messages include, without limitation, identifying the recipient clients of the new email message as being the same or substantially similar group of clients associated with receiving emails in the email thread (which is an indication that this is likely an email message regarding the same or similar topic associated with the email thread), linking the new email with the email thread based upon the new email being a reply message to an email message already identified as being a part of the email thread (so, for this scenario, the client could significantly change the subject matter line of the new email message, but since this new email message is a reply to an email message already identified within the email thread, the new email message would also be linked with the email thread), etc.

Thus, the methods and systems described herein facilitate the export of an email thread comprising a single email or a plurality of related emails to a synchronous communication session managed by a synchronous communication tool so as to encourage a more interactive and collaborative discussion of an issue in real-time between participants. This can in turn lead to a faster resolution of the issue being discussed within the email thread. In addition, by moving the emails from the email thread to the synchronous communication tool, these emails can be selectively deleted from a client email mailbox to prevent information overload as well as overload of mailbox storage allocated to the client.

The above description is intended by way of example only.

What is claimed is:

1. A method comprising:
    establishing an email thread utilizing an email application used by a client device configured to communicate with other client devices across a network, the email thread comprising a plurality of emails circulated to a group of users over the network relating to a discussion topic;
    linking the email application with a synchronous communication application to establish a real-time discussion between at least some of the users of the group in relation to the discussion topic utilizing the synchronous communication application;
    in response to establishing the real-time discussion in relation to the discussion topic utilizing the synchronous communication application, exporting the plurality of emails of the email thread from the email application to a storage location accessible by users associated with the real-time discussion, wherein only emails preceding establishing the real-time discussion are exported to the storage location, and each email of the email thread is accessible from the storage location via a graphical user interface associated with the synchronous communication application; and
    sending an alert message to a user utilizing the email application in response to the user sending an email to other users of the group in relation to the discussion topic after establishing the real-time discussion utilizing the synchronous communication application.

2. The method of claim 1, and further comprising inviting users from the group to engage in the real-time discussion utilizing the synchronous communication application.

3. The method of claim 2, wherein an invitation to engage in the real-time discussion is sent to the invited users via an email utilizing the email application.

4. The method of claim 2, wherein the number of invited users is less than the total number of users within the group.

5. The method of claim 1, and further comprising deleting each email of the email thread from the email application in response to exporting the plurality of emails of the email thread to the storage location.

6. The method of claim 1, and further comprising identifying each email of the email thread based upon content within a subject matter field of each email.

7. The method of claim 1, wherein the synchronous communication application is integrated with the email application.

8. The method of claim 1, wherein the real-time discussion comprises instant messaging between users of the group.

9. The method of claim 1, wherein the real-time discussion comprises video conferencing between users of the group.

10. An apparatus comprising:
    a network interface device configured to enable communications over a network;
    a memory configured to store instructions for:
        an email application to facilitate email communications between client devices over the network;
        a synchronous communication application to facilitate a real-time discussion between client devices; and an email to synchronous communication application to link the email application with the synchronous communication application; and a processor configured with logic to execute and control operations of the email application, the synchronous communication application and the email to synchronous communication application to:

establish an email thread of the email application, the email thread comprising a plurality of emails circulated to a group of users over the communication network relating to a discussion topic; and link the email application with the synchronous communication application to establish the real-time discussion between at least some of the users of the group in relation to the discussion topic utilizing the synchronous communication application;

in response to establishing the real-time discussion in relation to the discussion topic utilizing the synchronous communication application, exporting the plurality of emails of the email thread from the email application to a storage location accessible by users associated with the real-time discussion, wherein only emails preceding establishing the real-time discussion are exported to the storage location, and each email of the email thread is accessible from the storage location via a graphical user interface associated with the synchronous communication application; and send an alert message to a user utilizing the email application in response to the user sending an email to other users of the group in relation to the discussion topic after establishing the real-time discussion utilizing the synchronous communication application.

11. The apparatus of claim 10, wherein the processor is further configured to control operations of the email to synchronous communication application to invite users from the group to engage in the real-time discussion utilizing the synchronous communication application.

12. The apparatus of claim 11, wherein the processor is configured to send an invitation to engage in the real-time discussion to users via an email utilizing the email application.

13. The apparatus of claim 11, wherein a number of invited users is less than the total number of users within the group.

14. The apparatus of claim 10, wherein the processor is further configured to control operations of the email to synchronous communication application to delete each email of the email thread from the email application in response to exporting the plurality of emails of the email thread to the storage location.

15. The apparatus of claim 10, wherein the email application, the synchronous communication application, and the email to synchronous communication application are integrated as a single software application.

16. One or more storage devices comprising computer readable storage media encoded with software comprising computer executable instructions and when the software is executed operable to:

establish an email thread utilizing an email application used by a client device configured to communicate with other client devices across a network, the email thread comprising a plurality of emails circulated to a group of users over a network relating to a discussion topic;

link the email application with a synchronous communication application to establish a real-time discussion between at least some of the users of the group in relation to the topic utilizing the synchronous communication application;

in response to establishing the real-time discussion in relation to the discussion topic utilizing the synchronous communication application, exporting the plurality of emails of the email thread from the email application to a storage location accessible by users associated with the real-time discussion, wherein only emails preceding establishing the real-time discussion are exported to the storage location, and each email of the email thread is accessible from the storage location via a graphical user interface associated with the synchronous communication application; and send an alert message to a user utilizing the email application in response to the user sending an email to other users of the group in relation to the discussion topic after establishing the real-time discussion utilizing the synchronous communication application.

17. The one or more storage devices of claim 16, and further comprising instructions operable to invite users from the group to engage in the real-time discussion utilizing the synchronous communication application.

18. The one or more storage devices of claim 17, and further comprising instructions operable to send an invitation to engage in the real-time discussion to the invited users via an email utilizing the email application.

19. The one or more storage devices of claim 17, wherein the number of invited users is less than the total number of users within the group.

20. The one or more storage devices of claim 16, and further comprising instructions operable to delete each email of the email thread from the email application in response to exporting the plurality of emails of the email thread to the storage location.

21. The one or more storage devices of claim 16, and further comprising instructions operable to identify each email of the email thread based upon content within a subject matter field of each email.

22. The one or more storage devices of claim 16, wherein the instructions operable to establish the real-time discussion comprises instructions operable to establish instant messaging between users of the group.

23. The one or more storage devices of claim 16, wherein the instructions operable to establish the real-time discussion comprises instructions operable to establish video conferencing between users of the group.

* * * * *